(12) United States Patent
Hoppe et al.

(10) Patent No.: US 7,679,620 B2
(45) Date of Patent: Mar. 16, 2010

(54) IMAGE PROCESSING USING SALTATING SAMPLES

(75) Inventors: Hugues Hoppe, Redmond, WA (US); John Platt, Redmond, WA (US); Sylvain Lefebvre, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 708 days.

(21) Appl. No.: 11/192,640

(22) Filed: Jul. 28, 2005

(65) Prior Publication Data

US 2007/0024638 A1 Feb. 1, 2007

(51) Int. Cl.
*G09G 5/00* (2006.01)
(52) U.S. Cl. .................. 345/606; 345/589; 345/609; 345/610; 345/428
(58) Field of Classification Search ............... 345/419, 345/428
See application file for complete search history.

(56) References Cited

U.S. PATENT DOCUMENTS

| | | | |
|---|---|---|---|
| 5,526,468 A | 6/1996 | Kolb et al. | |
| 5,689,343 A * | 11/1997 | Loce et al. ................. | 358/3.21 |
| 5,742,703 A | 4/1998 | Lin et al. | |
| 5,875,268 A * | 2/1999 | Miyake ....................... | 382/276 |
| 6,281,875 B1 * | 8/2001 | Zhao et al. ................... | 345/611 |
| 6,430,321 B1 | 8/2002 | Choo | |
| 6,526,180 B1 * | 2/2003 | Carley ......................... | 382/268 |
| 7,200,263 B2 * | 4/2007 | Curry et al. ................. | 382/154 |
| 7,233,695 B2 * | 6/2007 | Curry et al. ................. | 382/162 |
| 7,236,641 B2 * | 6/2007 | Curry et al. ................. | 382/254 |
| 7,382,489 B2 * | 6/2008 | Curry et al. .................. | 358/1.9 |
| 7,496,242 B2 * | 2/2009 | Hunt ........................... | 382/293 |
| 2002/0114513 A1 * | 8/2002 | Hirao ........................... | 382/167 |
| 2002/0154134 A1 | 10/2002 | Matsui | |
| 2002/0158882 A1 * | 10/2002 | Liaw et al. ................... | 345/589 |
| 2002/0167459 A1 * | 11/2002 | Baudisch et al. ............ | 345/1.3 |
| 2003/0085912 A1 * | 5/2003 | Soo et al. ..................... | 345/698 |
| 2004/0165081 A1 * | 8/2004 | Shibaki et al. ........... | 348/222.1 |
| 2005/0017969 A1 | 1/2005 | Sen et al. | |
| 2006/0214940 A1 * | 9/2006 | Kinoshita et al. ........... | 345/589 |

OTHER PUBLICATIONS

Burt, "The Laplacian Pyramid as a Compact Image Code", 1983, IEEE, pp. 532-540.*
Barshadeski, O., Shytiak, I. "Superresoution with Diffusion Function", Technion-Israel Institute of Technology, http://66.102.7.104/search?q=cache;80wDkdcwINMJ:visl.technion.ac.il/projects/1000w23/+image+superresolution+edge&hl=en. Last accessed May 19, 2005.
"Version 1 is a Plug-In for all Applications on Windows or MacOS 9/X", http://graphicssoft.about.com/gi/dynamic/offsite.htm?zi=1/XJ&sdn=graphicssoft&zu=http%3A%2F%2Fwww.humansoftware.com%2Fpages1200%2FXFile%2FHSxfil0.html. Last accessed Jun. 23, 2005.

* cited by examiner

*Primary Examiner*—Kee M Tung
*Assistant Examiner*—Jwalant Amin
(74) *Attorney, Agent, or Firm*—Lyon & Harr, LLP; Katrina A. Lyon (57) ABSTRACT

A saltating sample image enhancement system and method that provides an image processing operation in which a filter considers one or one or more exact source image pixels; one or more bilinearly interpolated source image samples, where the bilinear weights are coupled to the position of the target pixel relative to the source pixels; and (optionally) one or more linearly interpolated source image samples, where the linear weights are coupled to the position of the target pixel relative to the source pixels. The filter can construct a spatially continuous image statistic.

16 Claims, 10 Drawing Sheets

| Input image | 4X Bilinear magnification | 4X Magnification with Saltating Sample Image Enhancement System |
|---|---|---|
| also | also | also |
| Sign In | Sign In | Sign In |
| | | |
| | | |

IMAGE PROCESSING USING SALTATING SAMPLES

BACKGROUND

Background Art

High-resolution displays, those greater than or equal to 120 dots per inch, are becoming very common as prices of LCD monitors decrease. As monitor resolution increases, it is desirable for the number of pixels for a line of text or a graphic or a piece of line art to increase, so that it stays the same size on the screen instead of becoming smaller. However, this is typically not the case. Other operations must often be performed to increase the clarity of the text, line art or graphic when they are displayed at a higher resolution.

For text that is generated on the same computer that is displaying the text, increasing the resolution of the text on that computer is not a problem. One can render smooth text at any desired resolution using known font-rendering systems, some which use sub-pixel rendering. These font-rendering systems dramatically improve font display resolution and improve screen readability. Increasing the size of photographs is also typically not a problem. Standard algorithms such as bilinear or bicubic interpolation are capable of magnifying photographs fairly well.

However, sometimes people want to display text, line art, or graphics that they did not generate themselves. This can occur, for example, when they get bitmaps of text, line art, or graphics over the Internet. For example, in web pages, navigation tabs and graphics are generated once by a graphic artist, and then are stored on a server as a bitmap (a matrix of pixels). When this bitmap is sent to a client and then magnified with a standard magnifying algorithm, the text, line art, or graphics looks terrible. The high-contrast edges look both jaggy and blurry. As is known in the art, a jaggy is the stair-stepping effect a person sees along curves or on the edges of on-screen text or bitmap graphics. In addition, people want to display icons on their high-resolution displays. These icons are bitmaps created at a fixed size by a graphics artist. A user may want to see these icons at a higher resolution, but standard algorithms again make them look jaggy and blurry when their size is increased.

In general, in image processing, it is desirable to compute image statistics for various purposes. In some cases, it is especially desirable to compute statistics over a small sliding window to create a spatially continuous function (for instance, the minimum luminance value within a small area of an image). In this later case, it is often desirable to obtain continuous statistics: as the window slides over the discrete samples (i.e. the pixels), the resulting statistics must not 'jump' from a value to another but continuously go from a value to another. As will be seen later, this is especially important with magnification applications to avoid visual artifacts in the final result. A classical approach to obtain a statistic over a sliding window would be to consider only the discrete samples enclosed within the window. However, as samples come in and out of the sliding window, the statistics would become discontinuous. Another approach would be to compute the statistic from fixed locations within the window (for instance, corners and center). The values at these locations would be obtained by bilinear interpolation of the discrete samples. This would provide continuous statistics. However, the statistics would misrepresent the values of the original samples, as they are no longer directly accessed as only bilinear combinations of the samples are considered. In particular, a minimum or maximum statistic would be incorrect.

SUMMARY

The saltating sample image enhancement system and method of the invention can construct a spatially continuous image statistic. For example, in one embodiment a "neighborhood minimum/maximum filter" is constructed that determines a maximum or minimum of an image neighborhood or subset of image pixels. The saltating sample image enhancement system and method forms a filter that considers both exact pixels and bilinearly blended pixels (and optionally linear blended pixels). To create a higher resolution image, 'target pixels' (pixels in a higher resolution version of the original source image) are computed using pixels (e.g., source pixels) from the original source image. There are several 'target pixels' in between the 'source pixels'. As a target pixel (the pixel that is being filtered or for which the statistic is being computed) moves across the source image, the positions of these exact source pixels (as well as any linearly interpolated samples) saltate across the image. That is, as the target sample moves left or right the position of the samples used to calculate the target sample saltate (change relative position with respect to the target sample does). Samples that are non-saltating always retain the same relative location with respect to the target sample. The use of saltating samples allows the saltating sample image enhancement system and method to efficiently construct a spatially continuous minimum (or maximum) neighborhood statistic. This statistic is constructed using not only the exact source pixels, but also additional interpolations which are the result of one or more linear or bilinear interpolations. In one embodiment the linear interpolated samples are saltating. If all the sets of exact saltating samples, bilinearly interpolated non-saltating samples, and linearly interpolated saltating samples are selected for the computation of the statistic, then the computed statistic is spatially continuous.

In one embodiment, the saltating sample image enhancement system and method of the invention provides a technique for computing image statistics which can be used, for example, for generating high-resolution images from low-resolution images. An original, low-resolution image or bit-map is input. In one embodiment, if the low-resolution image is a color image, the low-resolution image is divided to provide for a luminance image (one that is based on the luminance alone) and color channel data of the original image, by a converter. In one embodiment the color space is converted from RGB to YIQ, but other color space conventions could be employed. If the low-resolution image is a grey-scale image, it may be used directly as a luminance image. The luminance image is magnified by using a standard magnification filter to produce a magnified luminance image. For example, one embodiment of the invention employs a simple bilinear filter, but alternatively more sophisticated techniques such as bicubic filtering can be used. A non-magnified version of the luminance image is also processed by a minimum/maximum filter that determines neighborhood minimums and maximums in the luminance image. This maximum/minimum filter also defines both a minimum function and a maximum luminance function, at the same resolution as the magnified luminance image, and both the minimum and maximum luminance functions have the property of being spatially continuous. The magnified luminance image and neighborhood minimums and maximums of the magnified luminance image are processed by a contrast enhancement module so that the contrast of each image pixel of the magnified image is enhanced based on the neighborhood luminance maximums and minimums. This results in a contrast-enhanced magnified luminance image. Finally, if the original image was a color image, the saltating sample image enhancement system and method of the invention employs a converter to combine the luminance of the enhanced output pixels with the color values produced by the magnification algorithm used to magnify the color data resulting in a high-resolution image or bitmap from the contrast-enhanced pixels.

The saltating sample image enhancement system and method of the invention produces sharp edges in bitmaps and images containing text, line art, photos and other content. Furthermore, the saltating sample image enhancement system and method of the invention is very fast and computationally efficient. This is in part due to the fact that it does not employ iterative algorithms. Additionally, the saltating image enhancement system and method of the invention can be simply implemented on a fast graphics processor.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environments

Figure 1:
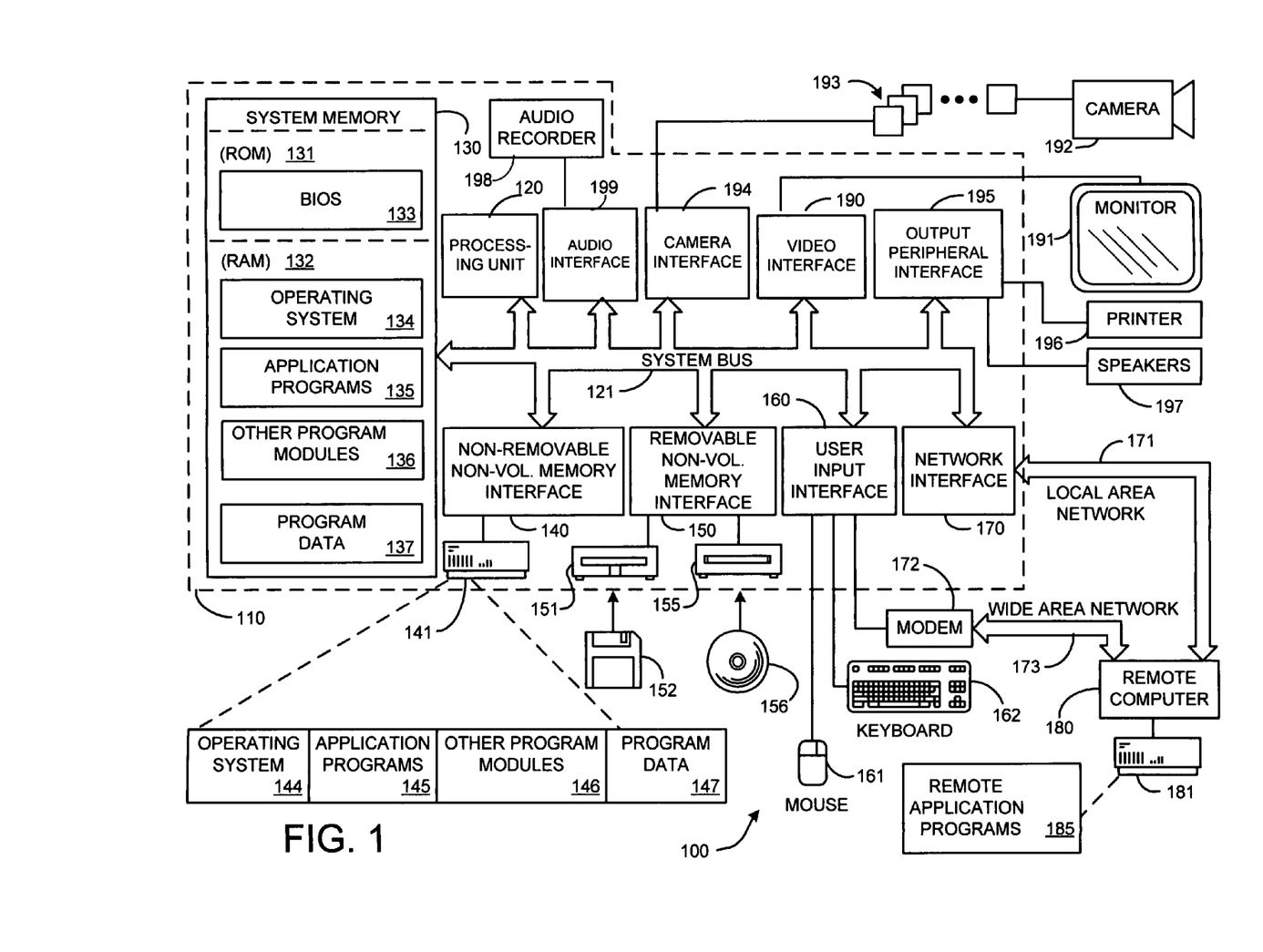
FIG. 1 is a diagram depicting a general purpose computing device constituting an exemplary system for implementing the invention.
Figure 2:
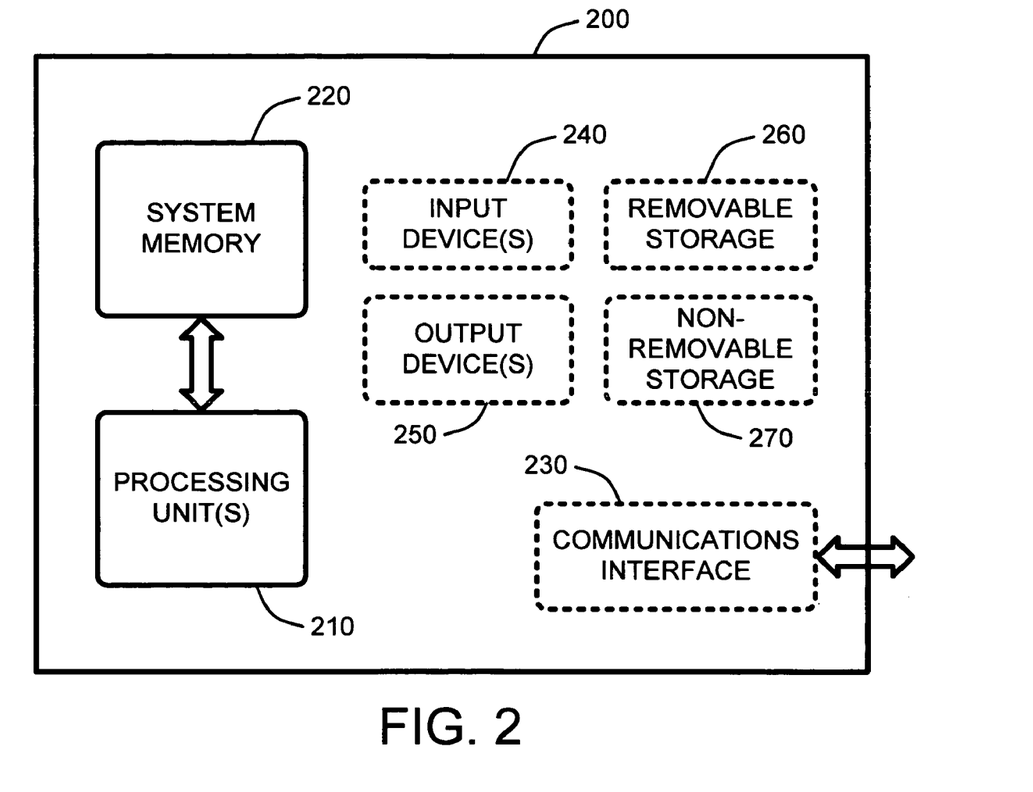
FIG. 2 is a general system diagram depicting a general device having simplified computing and I/O capabilities for use as the saltating sample image enhancement system of the invention.

FIG. 1 and FIG. 2 illustrate two examples of suitable computing environments on which various embodiments and elements of a saltating image enhancement system, as described herein, may be implemented.

FIG. 1 illustrates examples of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. Particular saltating sample image enhancement system embodiments, as described in further detail below, may also include devices having at least some minimum computational capability in combination with a communications interface, including, for example, home appliances, security systems, lighting, sensor networks, medical electronic devices, wearable computers, robotics, industrial controls, wired or wireless communication systems, audio nets, distributed computers, toys, games, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available physical media that can be accessed by computer 110 and includes both volatile and nonvolatile media, removable and non-removable media. By way of example, computer readable media may comprise physical computer storage media. Computer storage media includes volatile and nonvolatile removable and non-removable media implemented in any physical method or technology for storage of information such as computer readable instructions, data structures, program modules or other data. Computer storage media includes physical devices such as, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as an input device to the personal computer 110. The images 193 from the one or more cameras are input into the computer 110 via an appropriate camera interface 194. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192. An audio recorder 198 can also be connected to the computer via an audio interface device 199 for the purpose of capturing audio data.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device. Such computing devices can be typically be found in devices having at least some minimum computational capability, sometimes in combination with a communications interface, including, for example, home appliances, security systems, lighting, sensor networks, medical electronic devices, wearable computers, robotics, industrial controls, wired or wireless communication systems, audio nets, distributed computers, toys, games, camera systems, and so on. It should be noted that any boxes that are represented by broken or dashed lines in FIG. 2 represent alternate embodiments of the simplified computing device, as described herein, and that any or all of these alternate embodiments, as described below, may be used in combination with other alternate embodiments that are described throughout this document.

At a minimum, to enable a device to act as a salting sample image enhancement system (as described in further detail below), the device must have some minimum computational capability. In particular, as illustrated by FIG. 2, the computational capability is generally illustrated by processing unit(s) 210 (roughly analogous to processing units 120 described above with respect to FIG. 1). The processing unit(s) 210 illustrated in FIG. 2 may be specialized (and inexpensive) microprocessors, such as a DSP, a VLIW, chip or other microcontroller rather than the general-purpose processor unit of a PC-type computer or the like.

In addition, the simplified computing device of FIG. 2 may also include other components, such as, for example one or more input devices 240 (analogous to the input devices described with respect to FIG. 1). The simplified computing device of FIG. 2 may also include other optional components, such as, for example one or more output devices 250 (analogous to the output devices described with respect to FIG. 1). Finally, the simplified computing device of FIG. 2 may also have removable and/or non-removable storage, 260 and 270, respectively (analogous to the storage devices described with respect to FIG. 1 and a communications interface 230.

The exemplary operating environments having now been discussed, the remaining parts of this description section will be devoted to a description of the program modules embodying the invention.

2.0 Image Processing Using Saltating Samples

Figure 3:
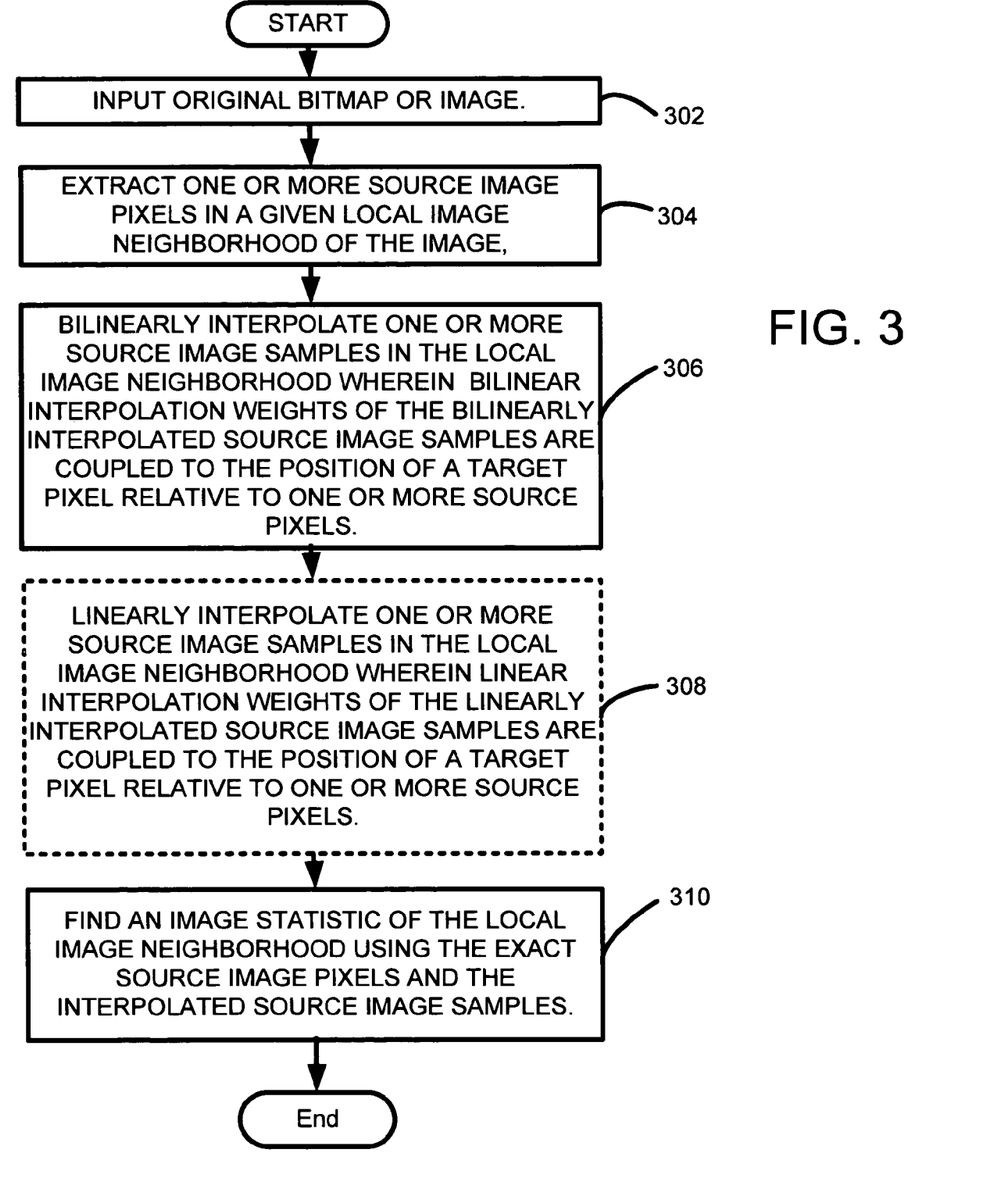
FIG. 3 is a very general flow diagram depicting the process of determining an image statistic according to one embodiment of the invention.

The saltating sample image enhancement system and method of the invention provides a technique for computing image statistics which can be used, for example, for generating high-resolution images from low-resolution images. As, shown in FIG. 3, the saltating sample image enhancement system provides an image processing operation in which an image or bitmap is input (process action 302). The system considers one or more exact source image pixels (e.g., pixels of the original image) in a given local image neighborhood of the input image, as shown in process action 304. Then one or more bilinearly interpolated source image samples (interpolated from the source image pixels using bilinear interpolation) are computed (process action 306). Bilinear weights of the bilinear interpolation algorithm are coupled to the position of a target pixel relative to the source pixels. Optionally, one or more linearly interpolated source image samples are also computed, where linear weights of the linear interpolation algorithm are coupled to the position of the target pixel relative to the source pixels (process action 308). Using these exact and interpolated source image pixels and samples, the saltating sample image enhancement system constructs a spatially continuous image statistic (process action 310). The invention operates on image neighborhoods, subsets of an image, such as a 4 by 4 pixel neighborhood containing 16 pixels. For example, in one embodiment a "neighborhood minimum/maximum filter" is constructed that considers both exact pixels and bilinearly blended pixels and linear blended pixels. As the target pixel moves across the source image, the positions of these exact pixels (as well as any linearly interpolated samples) saltate across the image. This allows the system and method to construct a spatially continuous minimum (or maximum) neighborhood statistic. If the linearly blended pixels are not used in this calculation for this embodiment, the minimum (or maximum) neighborhood statistic may not be totally spatially continuous. However, even when the linearly blended pixels are not used, the neighborhood statistic calculated will be more continuous than using the exact samples alone.

2.1 System Overview

Figure 4:
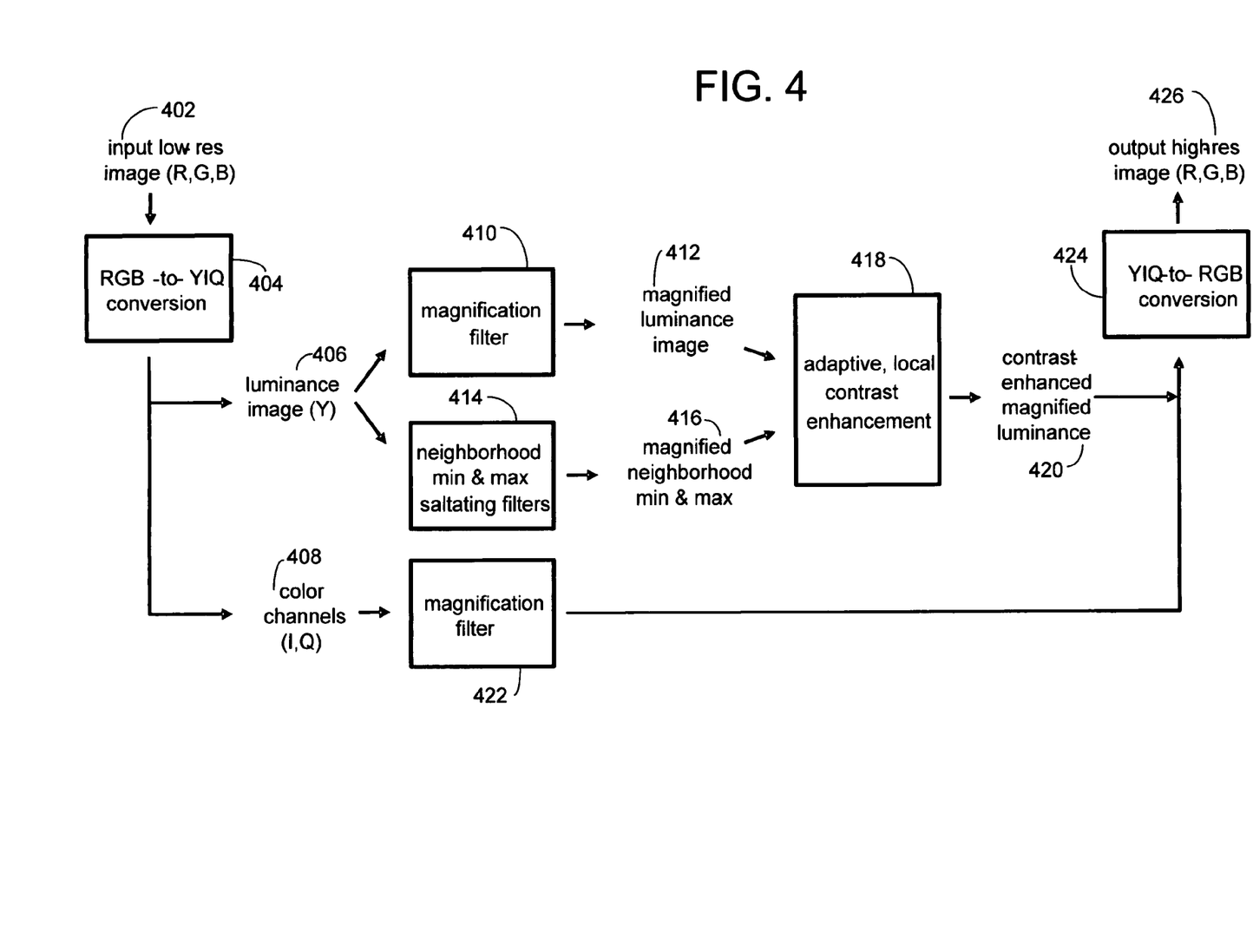
FIG. 4 is an overall block diagram of the saltating sample image enhancement system according to the invention.

A general exemplary overall system diagram of one embodiment of the saltating sample image enhancement system 400 according to the invention is shown in FIG. 4. An original, low-resolution image or bitmap 402 is input. In one embodiment, the low-resolution image or bitmap 402 is a color image. In that embodiment, the low-resolution image 402 is divided to provide for a luminance image (one that is based on the luminance alone) 406 and one or more color channel images (that contain only the color channel data of the original image) 408 by a converter 404. In one embodiment the color space is converted from RGB to YIQ. Other color spaces may be used, however. If the low-resolution image was grey-scale, converter 404 is unneeded, and the original image 402 can be used as the luminance image 406. The luminance image 406 is magnified by using a standard magnification filter 410 to produce a magnified luminance image 412. For example, one embodiment of the invention employs a simple bilinear filter, but alternatively more sophisticated techniques such as bi-cubic filtering could be used. The non-magnified luminance image 406 is also processed by a minimum/maximum filter 414 that determines neighborhood minimums and maximums 416 in the luminance image 406 while magnifying this data. The magnified luminance image and neighborhood minimums and maximums 416 of the magnified luminance image are processed by a contrast enhancement module 418 so that the contrast of each image pixel of the magnified image is enhanced based on the neighborhood luminance maximums and minimums. This results in a contrast-enhanced magnified luminance image 420. Finally, if the original low-resolution image 402 was a color image, the saltating sample image enhancement system and method of the invention combines the luminance of the enhanced output pixels 420 with the color values 408 magnified by a conventional magnification filter 422 and using a color converter 424 generates a high-resolution bitmap 426 from the contrast-enhanced pixels. If the original low-resolution image 402 was a grey-scale image, the enhanced output pixels 420 may be used directly as a high-resolution bitmap 426 and the color converter 424 is unneeded.

2.2 Overview of Method of Operation

Figure 5:
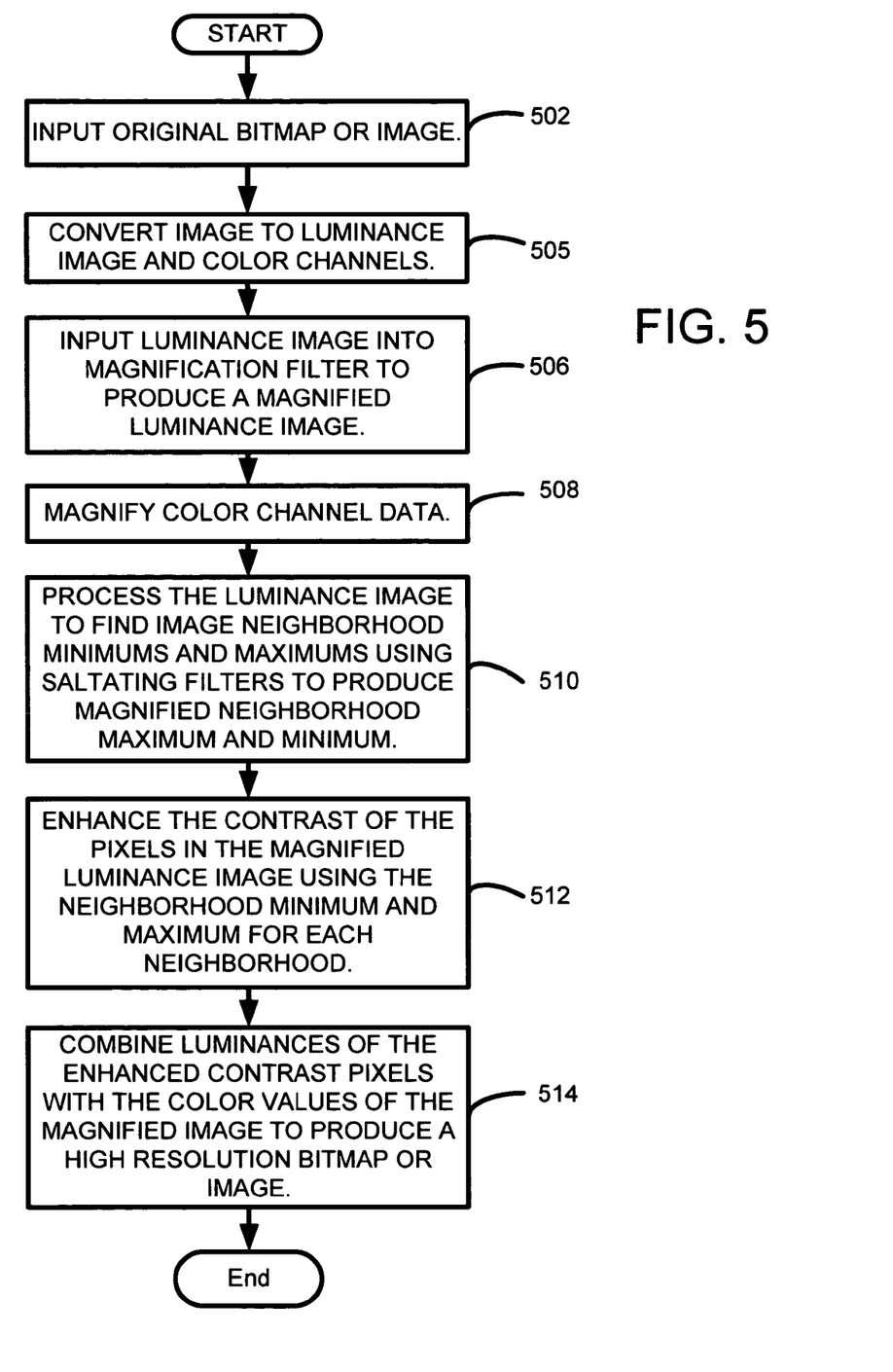
FIG. 5 is a general flow diagram showing the operation of an exemplary embodiment of the saltating sample image enhancement system according to the invention.

In general, as shown in FIG. 5, one embodiment of the saltating sample image enhancement system operates as follows. An original bitmap is input (process action 502) and divided into a luminance image and color channel data (process action 504). The luminance image is magnified to form a magnified luminance image (process action 506) and the color channel data is also magnified (process action 508). The non-magnified luminance image is also processed by a maximum/minimum filter to obtain local image neighborhood minimums and maximums (process action 510). This processing results in magnified image neighborhood maximums and minimums. Contrast enhancement on each image pixel of the magnified luminance image is performed based on the determined magnified local minimums and maximums (process action 512). Finally, the method of the invention combines all of the luminances of the contrast enhanced output pixels with the magnified color values to produce a high-resolution bitmap from the contrast-enhanced pixels (process action 514).

2.3 Magnification of Original Image

As described above, in one embodiment, one step of the saltating sample image enhancement system of the invention is to input an original image or bitmap, convert it to a luminance image and color data, and then magnify it. In one embodiment, this magnification is performed by applying a standard bilinear magnification algorithm to the luminance image and the color data to produce a magnified image of the desired resolution. Other embodiments employ various other conventional algorithms to magnify the luminance image and the color data, such as by using bicubic interpolation.

2.4 Applying Filter

Figure 6:
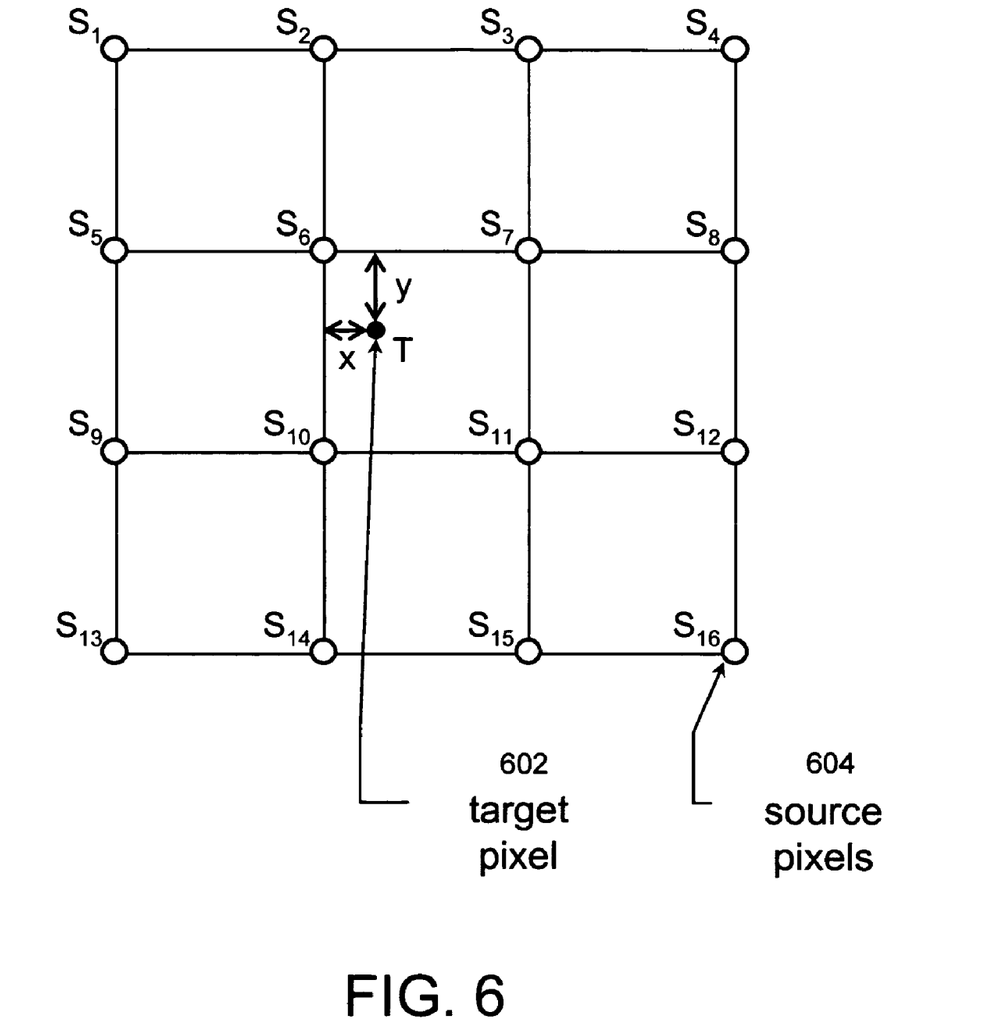
FIG. 6 is a diagram showing the local pixel neighborhood considered in determining a desired image statistic.
Figure 7:
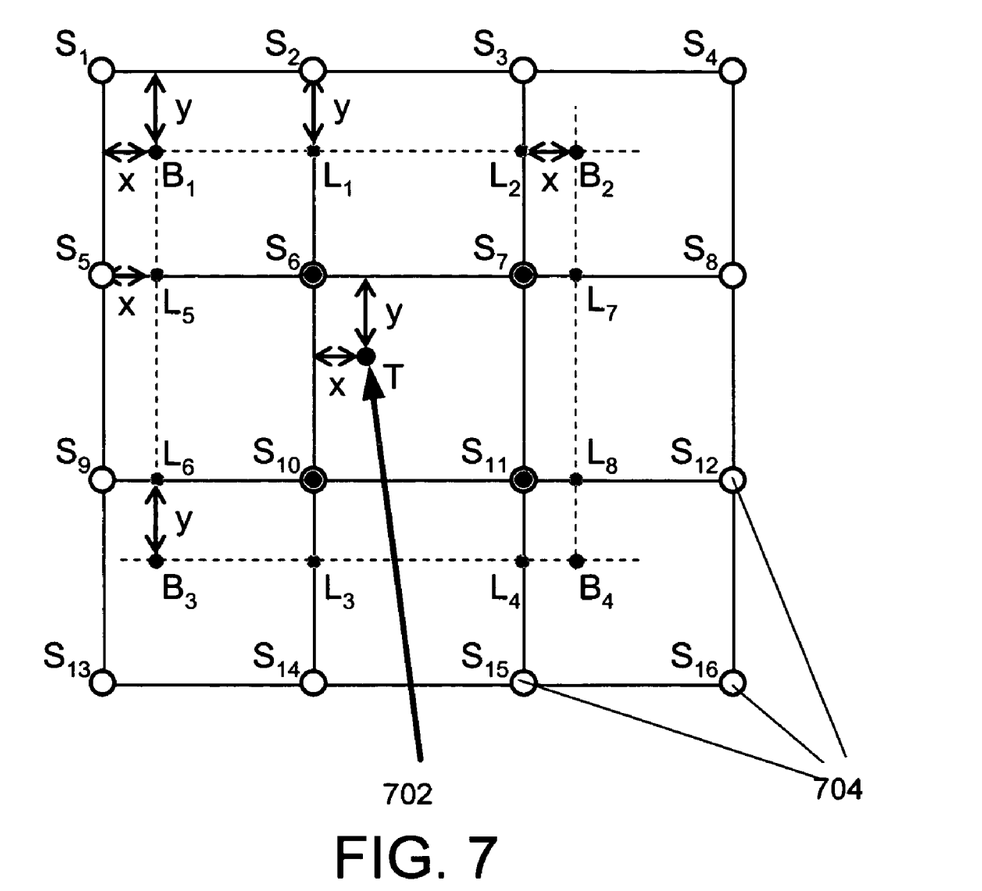
FIG. 7 is a diagram showing the samples considered in the local pixel neighborhood.

The minimum/maximum filter defines both a minimum function and a maximum luminance function, at the same resolution as the magnified luminance image, and has the property of being spatially continuous. The implementation of this filter is as follows. Referring to FIG. 6 as an example, to evaluate the minimum/maximum function at the target sample 602 in the output (magnified image), the system and method gathers a total of 16 samples 604. Then it computes from pixels 604, a set of 16 samples. Of these 16 samples, four are simply the closest original image samples. The remaining 12 samples are obtained using linear or bilinear interpolation of the 4×4 pixel neighborhood nearest samples of the input, as defined in FIG. 6. Hence, the computed samples are given by $S_6, S_7, S_{10}, S_{11}$, $B_1, B_2, B_3, B_4$, $L_1, L_2, L_3, L_4, L_5, L_6, L_7, L_8$, as shown in FIG. 7. The system computes the minimum and maximum values of these interpolated samples. Given the source location, the 16 computed samples are combined to obtain the minimum and maximum luminance in the neighborhood.

More specifically, referring to FIG. 7, given target pixel T 702, one embodiment of the invention considers a 4 by 4 pixel or image neighborhood, or 16 source pixels $S_1 \ldots S_{16}$ 704 to construct image statistics (for example, minimum and maximum luminance in the target pixel neighborhood). Here it is assumed that $0 \leq x \leq 1$ and $0 \leq y \leq 1$ are the relative coordinates of target pixel T 702 within the cell of the source pixel grid that contains T (in this exemplary case the cell is defined by source pixels $S_6, S_7, S_{10}, S_{11}$).

Referring to FIG. 7, for example, the saltating sample image enhancement system evaluates a statistic (e.g. minimum or maximum) using the following values:

the four source pixel values $S_6, S_7, S_{10}, S_{11}$ at the pixels closest to T 702.

the four bilinearly interpolated pixel values $B_1, B_2, B_3, B_4$.

the eight linearly interpolated pixel values $L_1, L_2, L_3, L_4, L_5, L_6, L_7, L_8$.

The specific bilinear and linear interpolates are respectively:

$B_1 = (1-y)(1-x)S_1 + (1-y)(x)S_2 + (y)(1-x)S_5 + (y)(x)S_6,$ and similarly for $B_2, B_3, B_4 \ldots$ $B_2 = (1-y)(1-x)S_3 + (1-y)(x)S_4 + (y)(1-x)S_7 + (y)(x)S_8,$ $B_3 = (1-y)(1-x)S_9 + (1-y)(x)S_{10} + (y)(1-x)S_{13} + (y)(x)S_{14},$ $B_4 = (1-y)(1-x)S_{11} + (1-y)(x)S_{12} + (y)(1-x)S_{15} + (y)(x)S_{16},$ $L_1 = (1-y)S_2 + (y)S_6,$ $L_5 = (1-x)S_5 + (x)S_6,$ and similarly for $L_2, L_3, L_4, L_6, L_7, L_8 \ldots$ $L_2 = (1-y)S_3 + (y)S_7,$ $L_7 = (1-x)S_7 + (x)S_8,$ $L_4 = (1-y)S_{11} + (y)S_{15},$ $L_6 = (1-x)S_9 + (x)S_{10},$ $L_3 = (1-y)S_{10} + (y)S_{14},$ $L_8 = (1-x)S_{11} + (x)S_{12},$ The linearly interpolated samples saltate, or change relative position to the target pixel as the target pixel moves across the image. For example, the position of sample L1 is always above that of the exact sample S6, so as the target sample T moves left or right, L1 will saltate just as S6 does. In one embodiment of the invention, the bilinearly interpolated samples do not saltate. In other words, the samples B1 . . . B4 are always at the same relative location with respect to the target sample T; therefore they are not saltating.

2.7 Contrast Enhancement

Enhancing the contrast serves to sharpen the image, because the edges in the final output will have a higher gradient, and hence will appear sharper. In one embodiment, the saltating sample image enhancement system adaptively enhances the contrast of each image neighborhood by employing neighborhood minimums and maximums for each pixel. In general, the adaptive, local contrast enhancement module operates on each pixel of the magnified luminance image. It evaluates the following formula:

$$L' = L + 4 \cdot C \cdot (L - \text{Min}) \cdot (\text{Max} - L) \cdot (L - ((\text{Min} + \text{Max})/2)) / ((\text{Max} - \text{Min})^2 + \epsilon)$$

where

L' is output luminance,

L is input luminance,

Min, Max are the continuous minimum/maximum functions at the current pixel, C is an emphasis parameter between 0 and 1 (with a preferred value of 1). In general C specifies the magnitude of the contrast enhancement. In one embodiment, the value C=1 is obtained through experimentation.

$\epsilon = 10^{-5}$ is a small constant to avoid a division by zero in areas of uniform luminance.

Figure 8:
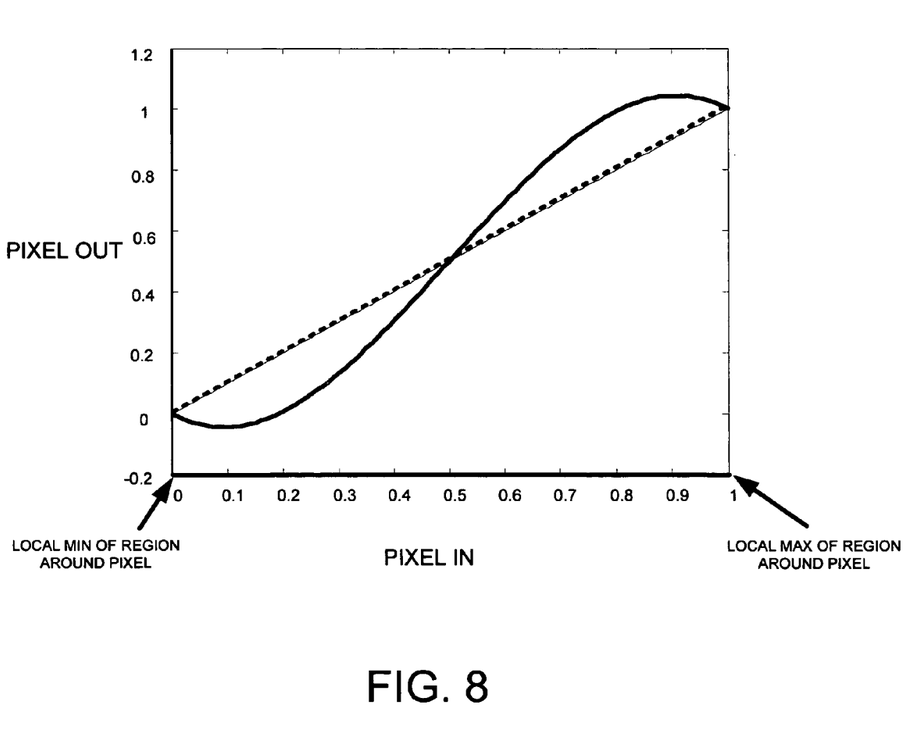
FIG. 8 is a graph showing the luminance transfer function for the adaptive, local contrast-enhancement module.

The graph shown in FIG. 8 shows typical behavior of the output or enhanced luminance L' as a function of the input luminance L. It can be seen that pixel values that are bright, get brighter, while dark pixels get darker. Thus, the contrast of image neighborhood pixels are adaptively enhanced using this function.

In the case that the magnified luminance image is obtained using a filter other than bilinear interpolation—for example using bicubic interpolation, then it can be the case that the input luminance L (412) may lie outside the range [Min,Max] (416). Any filter (like bicubic interpolation) that includes negative weights in its filter kernel can have this behavior. In this case, the saltating sample image enhancement system modifies the minimum and maximum value computed within 418 such that their range also includes L. The effect of this modification is that if the magnified luminance lies outside the locally computed minimum/maximum range, then the contrast enhanced luminance L' (420) is unchanged, i.e. it equals L. (One can note that if either L=Min or L=Max, then the formula above simply gives L'=L.)

2.8 Producing a High Resolution Bitmap from the Contrast Enhanced Pixels

Finally, the system and method of the invention combines all of the luminances of the contrast enhanced output pixels with the magnified color values to produce the final enhanced image. In other words, the saltating sample image enhancement system and method of the invention does not contrast enhance the color signal, only the brightness signal.

3.0 Exemplary Embodiments

The image statistics computed by the system and method of the invention can be used in many ways.

3.1 Single Rasterization Pass on a Graphics Processing Unit

One exemplary embodiment of the saltating sample image enhancement system and method of the invention was implemented as a single rasterization pass on a Graphics Processing Unit (GPU) (in one working embodiment, a NVIDIA® GeForce 6800 Ultra was used). Used primarily for 2-D image processing and 3-D rendering applications, a GPU is typically the microprocessor of a graphics card for a personal computer or game console. It is typically a single chip processor with integrated transform, lighting, triangle setup/clipping, and rendering engines. It creates lighting effects and transforms objects every time a 3D scene is redrawn. These are mathematically-intensive tasks, which otherwise, would put quite a strain on the CPU. Lifting this burden from the CPU frees up cycles that can be used for other jobs.

Rasterization is the process by which a primitive is converted to a two-dimensional image. Each point of this image contains such information as color and depth. Thus, rasterizing a primitive consists of two parts. The first is to determine which squares of an integer grid in window coordinates are occupied by the primitive. The second is assigning a color and a depth value to each such square. This can be achieved through programs called 'shaders'. The shader program used in one single-pass rasterization embodiment of the saltating sample image enhancement system and method is a "Pixel Shader Model 2.0 shader program", and uses 63 arithmetic instructions and 17 texture reads. It is able to fill a 1600×1200 window at 73 frames/sec, and the rate is constant for all magnification levels (2× to 16×). In one embodiment, single pass rasterization implements the entire diagram shown in FIG. 4 (from 402 to 406) as a single pixel shader program. The pixel shader program has a texture sampler bound to the input image 402, and has its "render target" bound to the destination image 426. For most efficient implementation, the pixel shader program binds two texture samplers to the input image 402, one in which the texture sampler has "nearest sampling" mode enabled, and the other one in which the texture sampler has "bilinear sampling" mode enabled. The sampler with nearest mode is used to access the samples S6,S7,S10,S11. The sampler with bilinear mode is used to access the remaining twelve samples.

Figure 9:
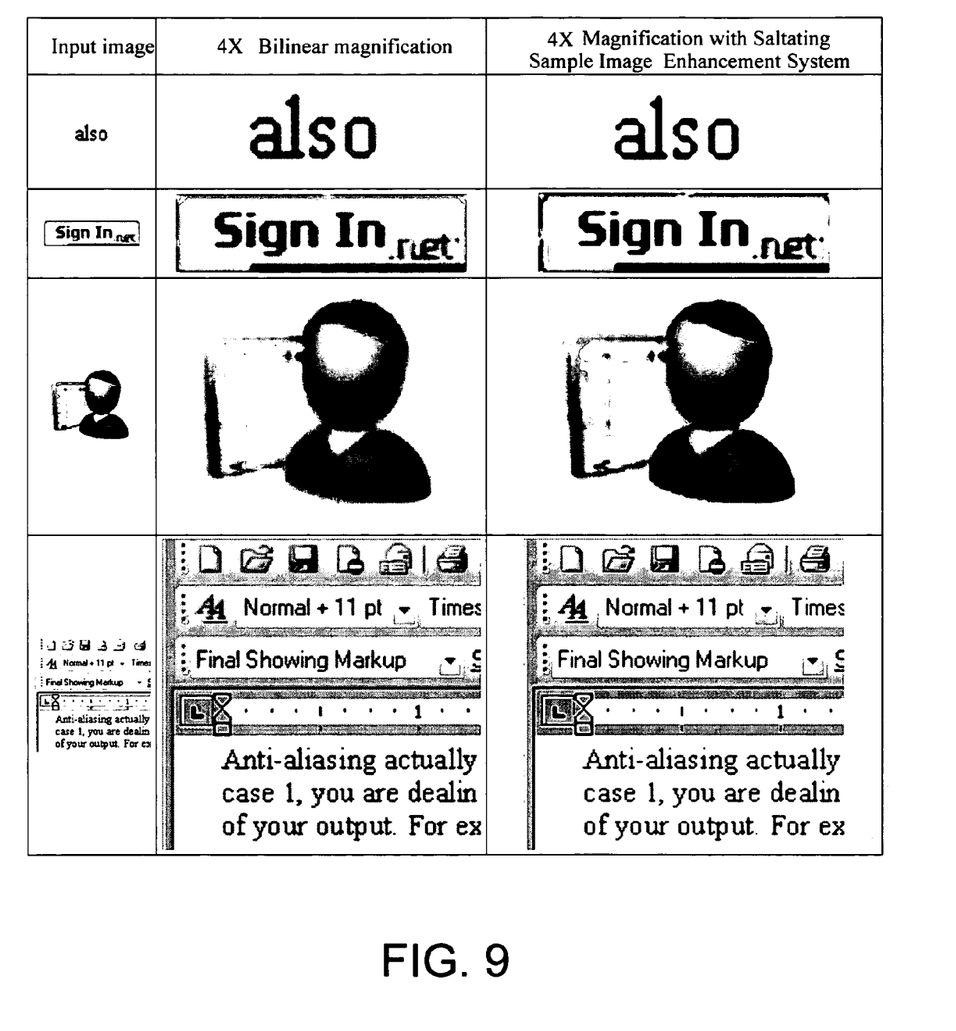
FIG. 9 provides examples of images magnified by conventional bilinear magnification and image magnification obtained using the saltating sample image enhancement system and method of the invention.

Examples of the results using this embodiment are shown in FIG. 9. As shown in the first row of FIG. 9, the image of the word "also" magnified four times with a simple bilinear magnification algorithm is much more fuzzy and blurry than the magnification of the same image with the saltating sample image enhancement system of the invention. Likewise, the "sign in" button in the second row of FIG. 9 is much more blurred when magnified with simple bilinear magnification than with the saltating sample image enhancement system of the invention, as shown on the right hand side of this row. The icon in the third row of FIG. 9 is also much more clear when magnified with the saltating sample image enhancement system of the invention, than with the bilinear magnification. Finally, the fourth and last row of the FIG. 9 depicts a window with text that is magnified with a bilinear magnification algorithm and with the saltating sample image enhancement system of the invention. The icons in the window magnified with the saltating sample image enhancement system of the invention are much clearer than those magnified with the bilinear magnification and the text also looks better.

It should be noted that the saltating sample image enhancement system and method of the invention can also be implemented as multiple rasterization passes on a GPU. In one embodiment, a first rasterization pass reads the input (R,G,B) image (402) and computes the luminance Y (406) and stores it into a 1-channel image. Then, a second rasterization pass performs the remaining steps of computation (404,410,414, 422,418,424) using both the (R,G,B) image and the Y image.

In yet another embodiment, the computed luminance Y channel is stored not as a separate image, but as a fourth channel along with the original (R,G,B) image, to form a 4-channel (R,G,B,Y) image. This 4-channel image is then processed by the second rasterization pass as before. Most graphics processing systems today allow for such 4-channel image formats, which are sometimes called (R,G,B,A) where A stands for alpha or transparency.

3.2 Window Scaling Embodiment

Figure 10:
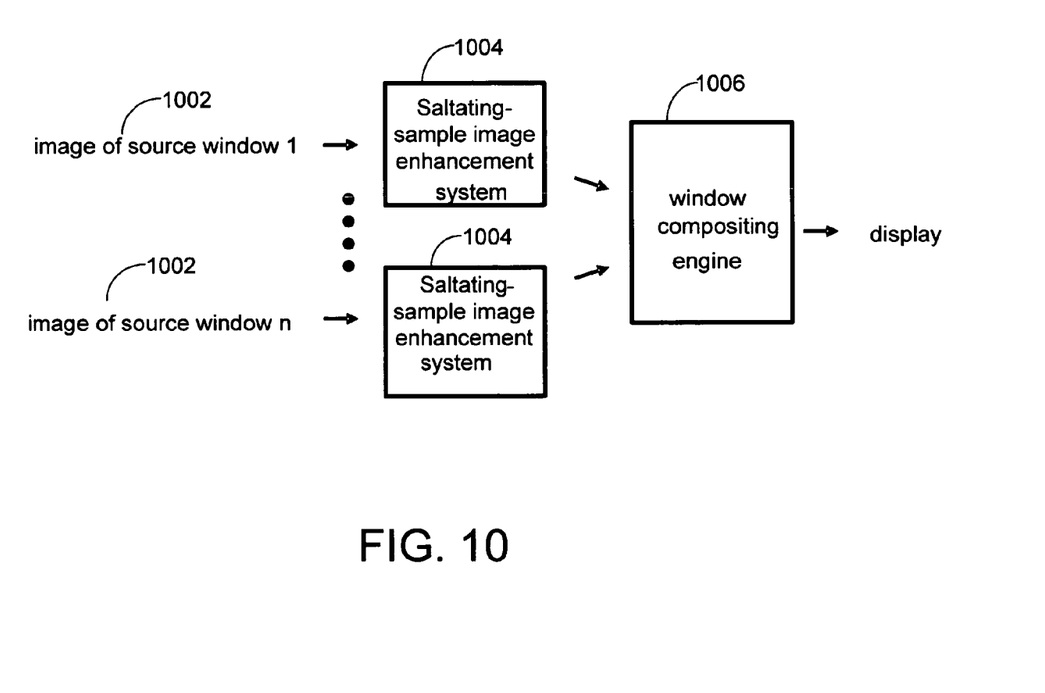
FIG. 10 provides an exemplary embodiment of the saltating sample image enhancement system and method of the invention employed for the purpose of scaling windows on a computer screen.

One exemplary embodiment of the saltating sample image enhancement system and method of the invention is used to provide for window scaling. In one embodiment of the invention, this is implemented on a GPU. As shown in FIG. 10, images of various source windows 1002, are input into a saltating sample image enhancement system 1004. The saltating sample image enhancement system operates on each window, in general as described with respect to FIG. 4, to scale the window to a larger size while providing a high level of resolution. Once all of the windows are scaled and enhanced, a window compositing engine 1006 composites the enhanced, scaled windows to a computer display, printer or any other output device.

In one embodiment, the window scaling feature of the invention is implemented as follows. The computer display is represented as a framebuffer, which is a region of memory that stores the raster image shown on the display. The compositing engine considers the windows in some order (probably back-to-front). For each window in this order, it applies the saltating sample magnification filter to the window image contents, and blends the resulting magnified image with the framebuffer image. The blending operation can be a replacement operation (if the window is opaque) or an interpolation operation (such as linear interpolation) (if the window is partially transparent). Thus, in the single rasterization pass embodiment just described, the magnified windows are not written to temporary image buffers, but are directly combined (accumulated) into the framebuffer contents, thereby saving memory and bandwidth.

A completely different embodiment is employed in an architecture that does not contain an explicit framebuffer, but instead directly writes the contents to be displayed to the display device, scanline by scanline. In this second embodiment, the compositing engine iterates through each scanline of the display (for example, from top to bottom). For each scanline, it determines the subset of windows that overlap the scanline. Then, it executes the saltating magnification filter to generate the row of each window that overlaps the current scanline, and combines these rows in some visibility order (such a back-to-front), possibly with transparency. Then, it writes the scanline to the display device. Thus, it is similar to the first embodiment, except that effectively the framebuffer is a single scanline of the display, and this scanline is swept (from top to bottom) across the display for each display frame that is rendered. This further reduces the amount of memory required by the display system.

The foregoing description of the invention has been presented for the purposes of illustration and description. It is not intended to be exhaustive or to limit the invention to the precise form disclosed. Further, it should be noted that any or all of the aforementioned alternate embodiments may be used in any combination desired to form additional hybrid embodiments. Many modifications and variations are possible in light of the above teaching. It is intended that the scope of the invention be limited not by this detailed description, but rather by the claims appended hereto.

Wherefore, what is claimed is:

1. A computer-implemented method for generating high-resolution bitmaps from low-resolution bitmaps, comprising using a computer to perform the process actions of:
   magnifying an image to form a magnified image;
   processing the non-magnified image using all of exact source image pixels, bilinearly blended source image pixels and linearly blended source image pixels of the non-magnified image to obtain a high-resolution, magnified minimum or maximum spatially continuous luminance only function of a local image neighborhood; wherein the process action of processing the non-magnified image to obtain a high resolution, magnified minimum or maximum spatially continuous luminance only function of the local image neighborhood comprises:
   identifying one or more exact source image pixels, wherein the source image pixels are selected in a given local image neighborhood;
   bilinearly interpolating one or more source image samples wherein bilinear interpolation weights of the bilinearly interpolated source image samples are coupled to the position of a target pixel relative to the source pixels, and wherein the one or more source image pixels saltate with respect to each target pixel when moving across the non-magnified image; and
   linearly interpolating one or more source image samples, wherein linear interpolation weights are coupled to the position of the target pixel relative to the source pixels, and wherein the one or more source image pixels saltate with respect to each target pixel when moving across the non-magnified image to find the spatially continuous luminance only minimum or maximum function of the local image neighborhood;
   performing contrast enhancement on each image pixel of each local image neighborhood of the magnified image based on the local minimum or maximum spatially continuous luminance only function; and
   producing a high-resolution image from the contrast-enhanced pixels.

2. The method of claim 1 wherein the image is a color image, and wherein the process action of magnifying the image to form a magnified image comprises the process actions of:
   converting the image to a luminance image and color channel data;
   magnifying the luminance image to form a magnified luminance image; and magnifying the color channel data; and wherein:
   the processing process action processes the non-magnified luminance image to obtain a high-resolution, magnified minimum or maximum spatially continuous luminance only function of a local image neighborhood; and wherein:
   the contrast enhancing process action performs contrast enhancement on each image pixel of each local image neighborhood of the magnified luminance image based on the local minimum or maximum spatially continuous luminance only function; and wherein:
   the high-resolution image producing process action produces a high-resolution image from the contrast-enhanced pixels and the magnified color channel data.

3. The method of claim 2 wherein the process action of producing a high resolution image from the contrast-enhanced pixels comprises combining luminances of the contrast-enhanced output pixels with color values.

4. The method of claim 1 wherein the process action of performing contrast enhancement on each image pixel of the magnified image comprises making pixel values with higher than the average pixel luminance brighter, and making pixel values with lower than the average pixel luminance darker.

5. The method of claim 1 wherein the minimum or maximum function of the local image neighborhood is based on pixel luminance.

6. The method of claim 1 wherein the image is a window displayed on an output device.

7. The method of claim 1 wherein the method is carried out by a Graphics Processing Unit using a single rasterization pass.

8. The method of claim 1 wherein the method is carried out by a Graphics Processing Unit using multiple rasterization passes.

9. A computer-readable storage medium having computer-executable instructions for generating an image statistic, said computer-executable instructions comprising:
   inputting an image;
   identifying one or more exact source image pixels in a given local image neighborhood of the image; and
   bilinearly interpolating one or more source image samples in the local image neighborhood wherein bilinear interpolation weights of the bilinearly interpolated source image samples are coupled to the position of a target pixel relative to the source pixels, and wherein the one or more source image pixels saltate with respect to each target pixel;
   linearly interpolating one or more source image samples in the local image neighborhood, where linear interpolation weights are coupled to the position of the target pixel relative to the source pixels, and wherein the one or more source image pixels saltate with respect to each target pixel when moving across the non-magnified image; and finding an image statistic of a local image neighborhood using the exact source image pixels, the linearly interpolated and the bi-linearly interpolated source image samples.

10. The computer-readable medium of claim 9 wherein the image statistic is more spatially continuous than computing the function using only the exact source image pixels.

11. The computer-readable medium of claim 9 wherein the image statistic is one of:

a maximum of the local image neighborhood; or a minimum of the local image neighborhood.

12. The computer-readable medium of claim 9 wherein the image statistic is based on luminance.

13. A system for scaling a window on a computing device's screen, comprising:

a general purpose computing device;

a computer program comprising program modules executable by the general purpose computing device, wherein the computing device is directed by the program modules of the computer program to, magnify a low-resolution bitmap of a window on a computing device's screen to form a magnified window bitmap;

process the low-resolution bitmap using exact source image pixels, bilinearly blended source image pixels and linearly blended source image pixels of the low-resolution bitmap to obtain high resolution, magnified minimum and maximum spatially continuous luminance only functions of a local bitmap window neighborhood;

perform contrast enhancement on each pixel of the magnified bitmap based on the local minimum and maximum spatially continuous luminance only functions; and produce a high-resolution bitmap of the window from the contrast-enhanced pixels.

14. The system of claim 13 wherein the program module to produce a high-resolution image from the contrast-enhanced pixels comprises sub-modules for:

using the local minimum and maximum functions to increase the luminance of pixels that are greater than the average of the local maximum and minimum; and using the local minimum and maximum functions to decrease the luminance of pixels that are less than the average of the local maximum and minimum.

15. The system of claim 13 wherein more than one window is displayed on the computing device's screen and wherein more than one high resolution of a window is produced.

16. The system of claim 13 wherein the program module to process the magnified bitmap of the window to obtain a minimum and maximum function comprises sub-modules for:

identifying one or more exact source image pixels, wherein the source image pixels are selected in a given local image neighborhood;

bilinearly interpolating one or more source image samples wherein bilinear interpolation weights of the bilinearly interpolated source image samples are coupled to the position of a target pixel relative to the source pixels, and wherein the one or more source image pixels saltate with respect to each target pixel when moving across the non-magnified image; and linearly interpolating one or more source image samples, where the linear interpolation weights of the linearly interpolated source image sample are coupled to the position of the target pixel relative to the source pixels, and wherein the one or more source image pixels saltate with respect to each target pixel when moving across the non-magnified image to find a minimum or maximum function of the local image neighborhood.

* * * * *